US011012912B2

(12) United States Patent
Watson et al.

(10) Patent No.: US 11,012,912 B2
(45) Date of Patent: May 18, 2021

(54) PREDICTIVE HANDOFF AND WIRELESS ASSOCIATION IN A NETWORK

(71) Applicant: Charter Communications Operating, LLC, St. Louis, MO (US)

(72) Inventors: Christopher W. Watson, Highlands Ranch, CO (US); Matthew J. Dillon, Greenwood Village, CO (US); Taren G. McCullough, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/404,014

(22) Filed: May 6, 2019

(65) Prior Publication Data

US 2020/0359290 A1    Nov. 12, 2020

(51) Int. Cl.
*H04W 36/30*       (2009.01)
*H04W 36/00*       (2009.01)
*G06N 5/04*        (2006.01)
*H04B 17/327*      (2015.01)
*H04W 36/08*       (2009.01)

(52) U.S. Cl.
CPC ............ *H04W 36/30* (2013.01); *G06N 5/046* (2013.01); *H04B 17/327* (2015.01); *H04W 36/0085* (2018.08); *H04W 36/08* (2013.01)

(58) Field of Classification Search
CPC . H04W 36/30; H04W 36/08; H04W 36/0085; G06N 5/046; H04B 17/327
See application file for complete search history.

(56) References Cited

U.S. PATENT DOCUMENTS

| 2015/0110071 A1* | 4/2015 | Jo ..................... H04W 36/0072 370/331 |
| 2015/0117414 A1* | 4/2015 | Tang .................... H04W 36/30 370/332 |

\* cited by examiner

*Primary Examiner* — Jae Y Lee
(74) *Attorney, Agent, or Firm* — Armis IP Law, LLC

(57) ABSTRACT

According to one configuration, a first wireless access point communicates probe request communications to a mobile communication device. The first wireless access point monitors power levels associated with probe response communications from the mobile communication device. Via the monitored power levels, the communication management resource quantifies motion of the mobile communication device with respect to the first wireless access point and a corresponding region of wireless coverage provided by the first wireless access point. The communication management resource selects amongst multiple neighboring wireless access points in which to handoff the mobile communication device based on a prediction of which of the multiple wireless access points will provide a best chance of successfully receiving a handoff of a mobile communication device and corresponding wireless communication link from the first wireless access point.

38 Claims, 13 Drawing Sheets

NPS = (# OF SUCCESFUL "CAP" TO "NAP" - # OF FAILED "CAP" TO "NAP" + # OF NON-CLOUD CLIENT TRANSITIONS + # TOTAL "CAP" TO "NAP" FAST TRANSITIONS) / #TOTAL CLIENT TRANSITIONS

| ROUTE | # FAST SUCCESS | # FAST FAILURE | # NORMAL TRANSITIONS | FAST TOTAL | # TOTAL TRANSITIONS | NPS |
|---|---|---|---|---|---|---|
| 125-121-122 | 240 | 60 | 21 | 300 | 321 | 1.56 |
| 124-121-122 | 30 | 8 | 155 | 38 | 193 | 1.19 |
| ex_NO FAST | 0 | 0 | 50 | 0 | 50 | .1 |
| ex_HIGH FAIL | 0 | 50 | 50 | 50 | 100 | .05 |
| ex_HIGH SUCC | 50 | 0 | 10 | 50 | 60 | 1.83 |
| ... | | | | | | |

HANDOFF INFO 610

FIG. 6

PREDICTIVE HANDOFF AND WIRELESS ASSOCIATION IN A NETWORK

BACKGROUND

Conventional wireless networks typically include one or more wireless access points to provide mobile communication devices access to a remote network such as the Internet. In certain instances, a network environment enables a handoff of a respective mobile communication device from one wireless access point to another to provide continuous connectivity.

Current wireless systems assume that customer devices will automatically authenticate and connect to a different wireless access point when they are within proximity of a wireless access point hosting a respective signal. Thus, the different client behavior—iOS, Android, laptop, firmware version(s), chipset(s)—result in different user experiences.

Depending on the environment, there may be overlap of multiple Wi-Fi signals being broadcast between available WAPs.

BRIEF DESCRIPTION OF EMBODIMENTS

This disclosure includes the observation that placement and saturation of respective wireless access points in a wireless network environment is not determined by an MSO (Multi-System Operator), but instead residents or businesses utilizing the wireless access points. This leads to inconsistent handoff and coverage zones in all environments: including dense urban environments with high pedestrian usage and less dense, but higher mobility environments such as suburbs.

Embodiments herein provide novel ways of providing improved wireless communications to one or more mobile communication devices in a wireless network environment.

For example, in one embodiment, a first wireless access point communicates request communications (such as probe requests or other communications) to a mobile communication device. The first wireless access point monitors power levels associated with response communications (such as probe responses or other communications) from the mobile communication device. Via the monitored power levels associated with the response communications, the communication management resource quantifies motion of the mobile communication device with respect to the first wireless access point and its corresponding region of wireless coverage. Based at least in part on the quantified motion, and probability of a successful handoff, the communication management resource selects amongst multiple neighboring wireless access points in which to handoff the mobile communication device.

The handoff of the mobile communication device and corresponding wireless communication link can be based on a prediction of which of the multiple wireless access points is most likely best suited to receive the handoff of the mobile communication device. In one embodiment, selection of the best suited wireless access point is based on which of the available wireless access points historically provided a higher rate of successfully receiving handoffs of other mobile communication devices from the first wireless access point.

In accordance with still further embodiments, quantifying the motion of the mobile communication device with respect to the first wireless access point includes determining a rate at which a received wireless signal strength of the communications from the mobile communication device varies over time. In one embodiment, the mobile communication device transmits each of the response communications to the first wireless access point at a fixed power level. As the mobile communication device moves further away from the first wireless access point, a signal strength of the repeatedly transmitted communications received by the first wireless access point from the mobile communication device decrease in magnitude.

In accordance with further embodiments, the communication management resource initiates a handoff of the mobile communication device from the first wireless access point to a second wireless access point in a network environment based on the quantified motion and/or predicted location of the mobile communication device. For example, the communication management resource selects amongst multiple wireless access points in which to handoff the mobile communication device based on a prediction of which of the multiple wireless access points is best suited to provide a successful handoff from the first wireless access point.

Further embodiments herein include selecting the best suited wireless access point based on handoff metrics representing a prior success rate of performing handoffs associated with the current wireless access point and next wireless access points. In accordance with further embodiments, the communication management resource produces one or more handoff metrics, magnitudes of which indicate respective success rates associated with handoffs from the first wireless access point to a corresponding wireless access point.

In yet further embodiments, the communication management resource controls a rate at which the future (probe) request communications are communicated to the mobile communication device depending on a power level of receiving the (probe) response communications from the mobile communication device.

In one embodiment, the communication management resource increases a rate of communicating the probe request communications to the mobile device in response to detecting that the mobile communication device is nearing an edge of a wireless coverage region provided by the first wireless access point. Conversely, the communication management resource decreases a rate of communicating the probe request communications to the mobile device in response to detecting that the mobile communication device is moving toward the first wireless access point away from an edge of a wireless coverage region provided by the first wireless access point.

In yet further embodiments, the communication management resource: identifies multiple candidate wireless access points in which to handoff the mobile communication device, the multiple candidate wireless access points including a first candidate wireless access point and a second candidate wireless access point; retrieves a first metric, the first metric indicating a prior success rate of handing off communication devices from the first wireless access point to the first candidate wireless access point; retrieves a second metric, the second metric indicating a prior success rate of handing off communication devices from the first wireless access point to the second candidate wireless access point; and utilizes the first metric and the second metric as a basis to select amongst the multiple candidate wireless access points in which to handoff the mobile communication device. In one embodiment, the communication management resource (or other suitable resource) adjusts the first metric based on a respective success of handing off the mobile communication device to the first candidate wireless access point.

Further embodiments herein include selecting amongst multiple candidate wireless access points in which to handoff the mobile communication device based at least in part on a wireless access point from which the mobile communication device was handed off to the first wireless access point. In such an instance, the prior wireless connectivity of the mobile communication device with other wireless access points in a network environment is used as a basis to determine which of multiple wireless access points is best suited to receive a next handoff of the mobile communication device.

As previously discussed, embodiments herein include quantifying the motion of the mobile communication device with respect to the first wireless access point. In one embodiment, this includes detecting whether the mobile communication device is moving closer or further away from the first wireless access point. Depending on the detected direction and a magnitude of most recent determined power levels of the probe responses, the communication management resource initiates a handoff from the first wireless access point to a second wireless access point.

In accordance with further embodiments, the proposed solution as described herein introduces a cloud-based system to a respective Wi-Fi™ network to manage their authentication and roaming behavior. This cloud based system creates a record of the WAPs' client association information and probe rate of change by probe request/response signal levels that permits the cloud to generate graphs of the best next serving WAPs, with regard of proximity and user ground speed. Via graph (such as handoff information) generation, the cloud based system is operable to predict the likelihood of authenticated clients transitioning to a specific nearby WAP (Wireless Access Point) and enhance the roaming capability of the overall (public or private) Wi-Fi™ systems without diminishing its throughput capacity.

Embodiments herein are useful over conventional techniques. For example, in addition to benefits as previously discussed, certain embodiments herein provide benefits such as: i) WAP Environment Identification permitting insights into client and spectrum behavior, ii) vastly improves roaming/handoffs over wireless networks, iii) improves coverage and roaming on a per client, per type basis; i.e. iPhone, Samsung, Nokia, Surface Pro, vs. AP to AP roaming, iv) wireless access point coverage improves as association/handoff success training data grows, etc.

Further novel features over conventional techniques include:
  Sending probe requests from a wireless access point to a Client (mobile communication device) in order to quantify the motion towards or away from the cell station to assist in the handoff.
  Utilizing a cloud system to generate graphing algorithms based on the association/handoff likelihood of a client to a specific WAP's public Wi-Fi scored as a Neighbor Path Score.
  Coverage, roaming, and telemetry data on a per client, per type basis; such as iPhone™, Samsung™, Nokia™, Surface Pro™, etc.
  Utilizing a cloud system to establish a virtual proximal relationship via marginal adjustment of the cell's edge (caution line) and coverage edge (danger line) of all WAPs to each other based on association data and client station rate of change.
  Leveraging a cloud system to enhance the roaming capability of clients on public Wi-Fi systems without impacting capacity.
  Enhancing the wireless (such as Wi-Fi™) coverage and roaming support of wireless access points decreases the duration in which customers are utilizing LTE (Long Term Evolution) by giving that connection to broadband infrastructure.

Note that any of the resources as discussed herein can include one or more computerized devices, wireless access points, wireless base stations, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless channel selection and use. The instructions, when executed by computer processor hardware, cause the computer processor hardware (such as one or more co-located or disparately processor devices) to: communicate request communications from a first wireless access point to a mobile communication device; monitor power levels of response communications from the mobile communication device; and via the monitored power levels, quantify motion of the mobile communication device with respect to the first wireless access point.

Another embodiment herein includes a computer readable storage medium and/or system having instructions stored thereon to facilitate wireless channel selection and use. The instructions, when executed by computer processor hardware, cause the computer processor hardware (such as one or more co-located or disparately processor devices) to: communicate request communications from a first wireless access point to a mobile communication device; measure power levels of response communications from the mobile communication device; and control a rate at which the request communications are communicated to the mobile communication device depending on a power level of receiving response communications from the mobile communication device.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 6 is an example diagram illustrating metrics used as a basis to initiate handoffs of mobile communication devices according to embodiments herein.

Figure 1:
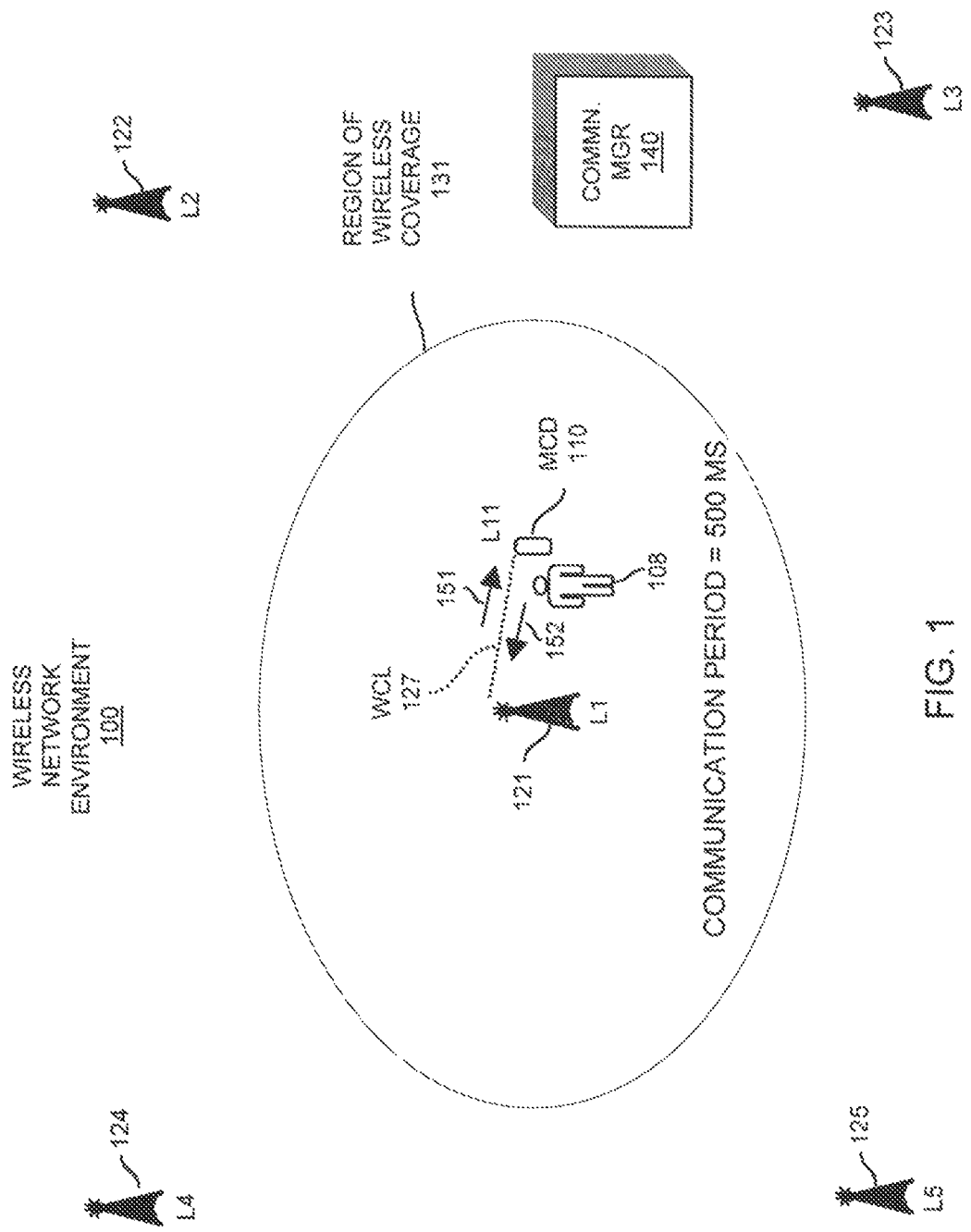
FIG. 1 is an example diagram illustrating a wireless network environment and monitoring of wireless communications from a mobile communication device according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a first wireless access point communicates (probe request) communications to a mobile communication device. The first wireless access point monitors power levels associated with (probe response) communications from the mobile communication device. Via the monitored power levels, the communication management resource quantifies motion of the mobile communication device with respect to the first wireless access point and its corresponding region of wireless coverage provided by the first wireless access point. The communication management resource selects amongst multiple neighboring wireless access points in which to handoff the mobile communication device based on a prediction and/or probability information. For example, in one embodiment, the communication management resource selects a wireless access point for the handoff based on which of the multiple wireless access points available for the handoff historically provides a higher rate of successfully receiving handoffs from the first wireless access point.

Now, more specifically, FIG. 1 is an example diagram illustrating generation of performance information (such as calibration information) according to embodiments herein.

As shown, wireless network environment 100 includes wireless access point 121 at location L1, wireless access point 122 at location L2, wireless access point 123 at location L3, wireless access point 124 at location L4, wireless access point 125 at location L5, etc., and mobile communication device 110 (such as user equipment roaming about the wireless network environment 100).

Each of the wireless access points in wireless network environment 100 provides connectivity to a network such as the Internet. Accordingly, via communications over the wireless communication link 127, the mobile communication device 110 is able to communicate over a respective network such as the Internet with one or more server resources. In a reverse direction, the one or more server resources are able to convey communications to the mobile communication devices through the wireless access points.

Note that each of the wireless access points in wireless network environment 100 can be configured to include a communication management resource 140 (such as hardware, executed software instructions, and/or a hybrid of both) supporting communications with one or more mobile communication devices (such as different instances of user equipment) in the network environment 100. Thus, communication management resource 140 can reside in one or more locations in network environment such as in each of the wireless access points, in each of the mobile communication devices, or in the cloud (such as disparately located with respect to the wireless access points and mobile communication devices).

In one embodiment, each of the mobile communication devices in wireless network environment 100 includes a respective communication management resource (such as hardware, executed software instructions, and/or a hybrid of both) facilitating communications with respective wireless access points.

Note that the wireless access points in wireless network environment 100 can be configured to support wireless communications in accordance with any suitable wireless protocol. For example, in one embodiment, the wireless access points support LTE (Long Term Evolution) communications, NR (New Radio) communications, CBRS (Citizen Band Radio System) communications, 3G, 4G, 5G, etc.

In this example embodiment, each of the wireless access points in wireless network environment 100 provides limited wireless coverage. For example, the wireless access point 121 at location L1 supports wireless communications to any user equipment (mobile communication devices) present in region of wireless coverage 121. When the mobile communication device 110 moves outside of region of wireless coverage 131, it is no longer able to wirelessly communicate with the wireless access point 121.

In one embodiment, the first wireless access point monitors movement of the mobile communication device in the region of wireless coverage 131. Based on the movement, the first wireless access point 121 determines whether to perform a respective handoff to another available wireless access point such as wireless access point 122, wireless access point 123, etc.

One way to determine a proximity of the mobile communication device 110 with respect to the edge of the region of wireless coverage 131 is to monitor communications from the mobile communication device 110. For example, the mobile communication device 110 can be configured to repeatedly transmit communications to the wireless access point 121. The wireless access point 121 analyzes the communications 152.

In one embodiment, the wireless access point 121 repeatedly transmits a communication 151 (such as a probe request) to the mobile communication device 110 every 500 milliseconds. In response to receiving the communication 151, the mobile communication device 110 transmits the communication 152 (such as a probe response communication) to the wireless access point 121 for each probe request.

Each response communication 152 can include any suitable information. In one embodiment, the mobile communication device 110 generates each response communication 152 to include a unique identifier value (such as a network address or MAC address) assigned to the mobile communication device 110 transmitting the respective communication 152, a BSSID value of wireless access point 121, a time stamp when the communication 152 is transmitted or generated, etc.

Note that the communication 152 optionally includes power level information indicating a wireless power level at which the mobile communication device 110 received a corresponding communication 151 from the wireless access point 121. Additionally, or alternatively, the wireless access point 121 is configured to monitor a wireless power level at which the communication 152 is received from the mobile communication device 110.

Via repeated communications 151 from the wireless access point 121 to the mobile communication device 110 and repeated communications 152 from the mobile communication device to the wireless access point 121, the wireless access point 121 monitors the respective power level of such communications to determine whether the mobile communication device 110 is moving towards or away from the wireless access point. In accordance with further embodiments, the wireless access point 121 uses the power level information to determine whether to increase or decrease a rate of communications 152 from the mobile communication device 110.

More specifically, during monitoring of the mobile communication device 110, the first wireless access point 121 controls a rate of the mobile communication device 110 generating response communications 152. When the wireless access point 121 detects that the mobile communication device 110 moves nearer to the wireless access point 121, such as due to a detected increase in a power level of receiving wireless communications 152 over time, the wireless access point 121 reduces the rate at which probe request communications 151 are communicated to the mobile communication device 110.

Conversely, when the wireless access point 121 detects that the mobile communication device 110 moves away from the wireless access point 121, such as due to a detected decrease in a power level of wireless communications 152 over time, the wireless access point 121 increases the rate at which the probe request communications 151 are communicated to the mobile communication device 110.

In accordance with further embodiments, via the monitored power levels associated with the response communications, the communication management resource of the wireless access point 121 quantifies motion of the mobile communication device 110 with respect to the first wireless access point 121 and a corresponding region of wireless coverage 131 provided by the first wireless access point 121. As further discussed below, based at least in part on the quantified motion, the communication management resource of the first wireless access point 121 selects amongst multiple neighboring wireless access points in which to handoff the mobile communication device 110.

Accordingly, embodiments herein include: establishing a wireless communication link 127 between the first wireless access point 121 and the mobile communication device 110; receiving probe response communications 152 from the mobile communication device 110; and controlling a rate at which the mobile communication device 110 communicates the probe response communications 152 to the first wireless access point 121 based on attributes (such as power level) of the probe response communications 152 received from the mobile communication device. As previously discussed, in one embodiment, the monitored attributes include a power level of the first wireless access point receiving the probe response communications 152.

Figure 2:
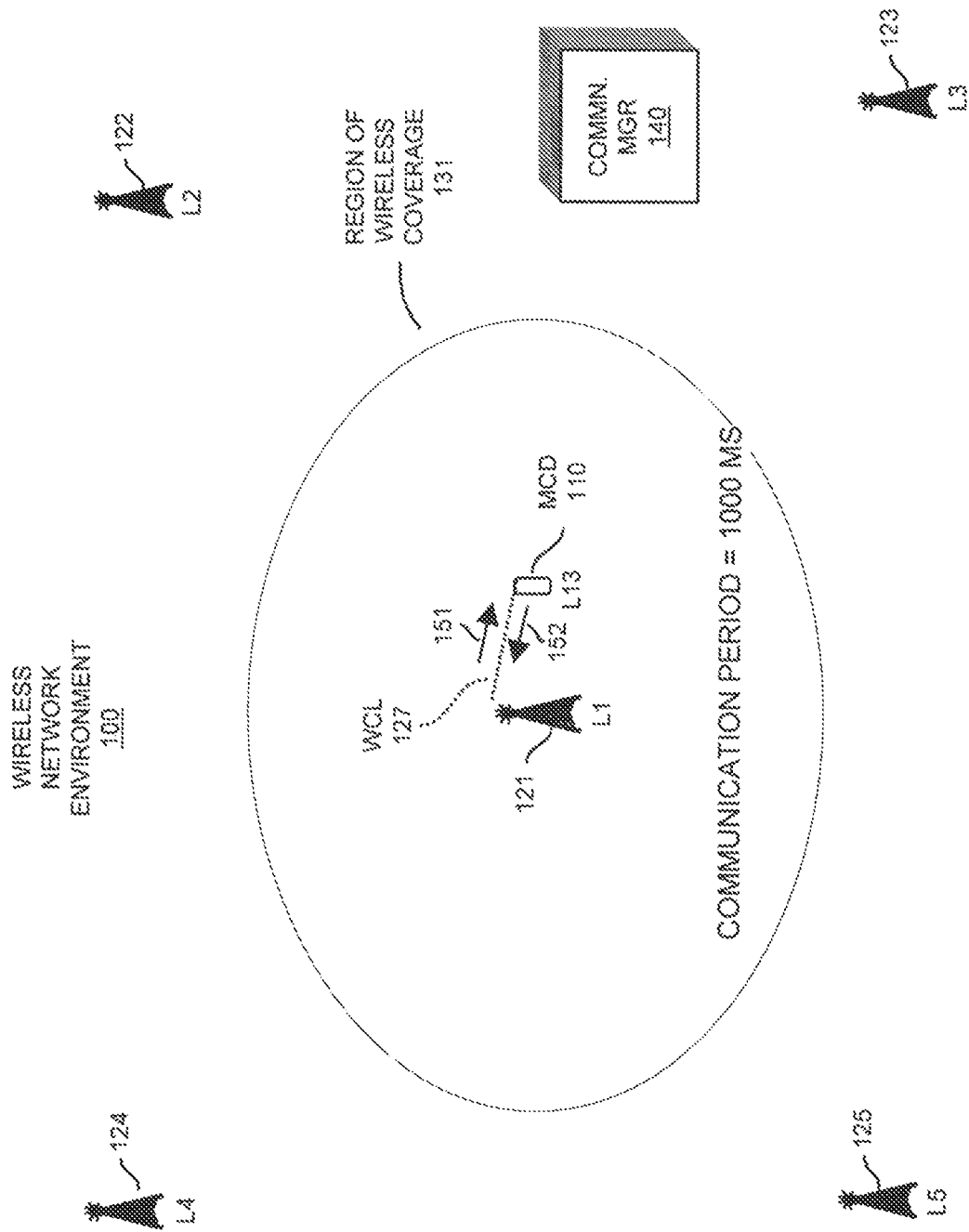
FIG. 2 is an example diagram illustrating a wireless network environment and monitoring of wireless communications from a mobile communication device according to embodiments herein.

As shown in FIG. 1, assume that the wireless access point 121 transmits a respective communication 151 every 500 milliseconds (first frequency). As the user 108 and corresponding communication device 110 move nearer to the wireless access point as shown in FIG. 2, the received power level of the communications 152 from the mobile communication device 110 increases. In such an instance, in response to detecting the increased power level and movement of the mobile communication device 110 nearer to the wireless access point 121, the wireless access point 121 communicates a probe request communication 151 at a lower rate such as once every 1000 milliseconds (lower rate of transmitting a prove request and receiving a probe response every 1000 milliseconds or lower frequency).

Figure 3:
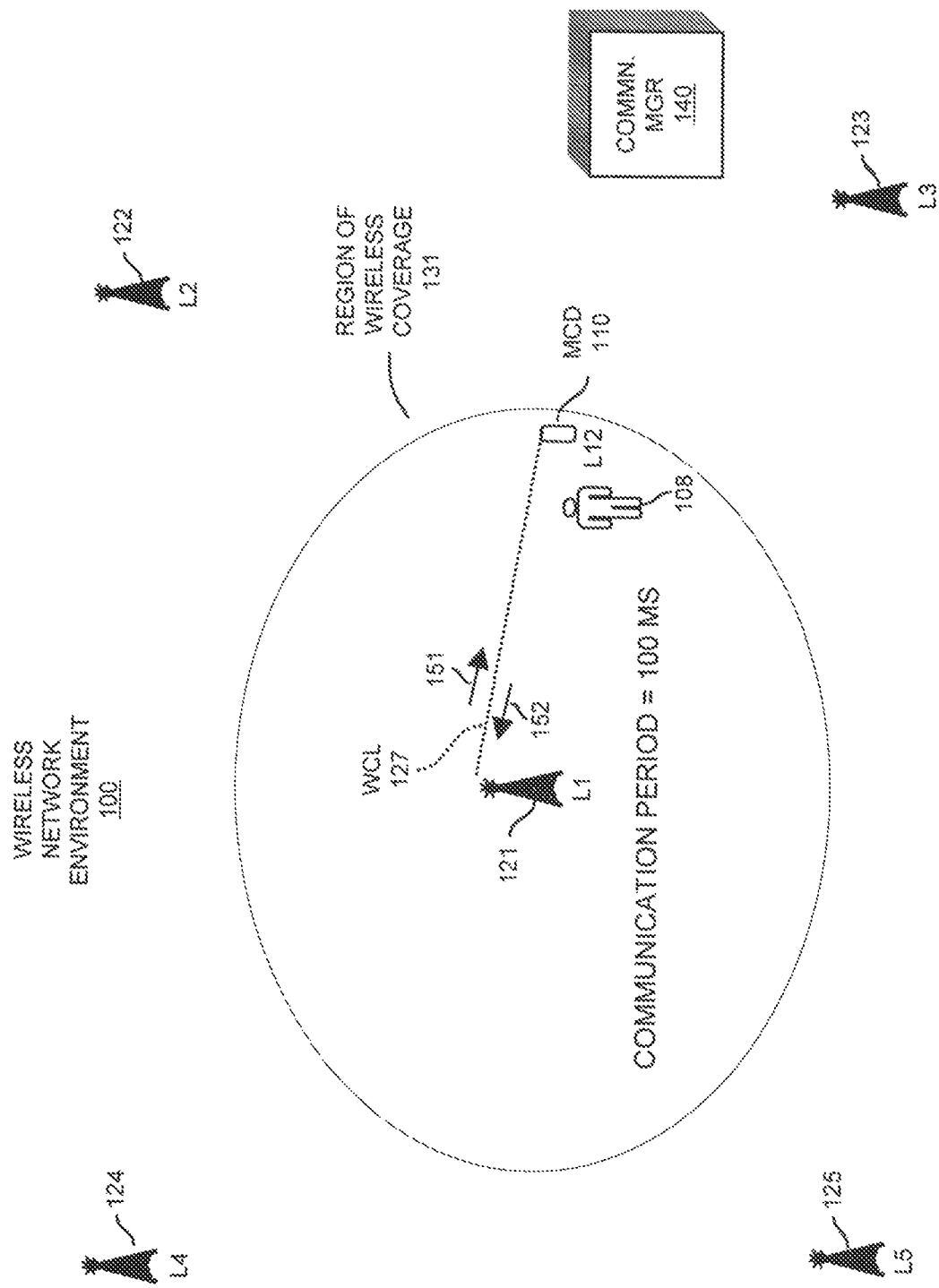
FIG. 3 is an example diagram illustrating a wireless network environment and monitoring of wireless communications from a mobile communication device according to embodiments herein.

As the user 108 and corresponding communication device 110 move away from the wireless access point nearer to the wireless access point as in FIG. 3, the received power level of the communications 152 from the mobile communication device 110 decreases. In this example embodiment, in response to detecting the decreased power level and movement of the mobile communication device 110 away from the wireless access point 121, the wireless access point 121 communicates the probe request communications 151 once every 100 milliseconds (higher rate of transmitting a prove request and receiving a probe response every 100 milliseconds or higher frequency).

In accordance with still further embodiments, quantifying the motion of the mobile communication device 110 with respect to the first wireless access point 121 includes determining a rate at which a received wireless signal strength of the communications 152 from the mobile communication device 110 varies over time. For example, in one embodiment, the mobile communication device 110 transmits each of the response communications 152 at a fixed power level. As previously discussed, as the mobile communication device 110 moves further away from the first wireless access point 121, a signal strength of the repeatedly transmitted communications 152 received by the first wireless access point 121 from the mobile communication device 110 decrease in magnitude.

Increasing a rate associated with communications 151 and 152 ensures a proper handoff of the mobile communication device 110. For example, when the power level associated with communications 152 is high, there is generally no worry that the mobile communication device 110 will move outside the region of wireless coverage 131 and lose wireless connectivity and access to the Internet (network). Thus, there is no need to receive communications 152 at a high rate. Conversely, when the mobile communication device 110 is nearer an edge of the region of wireless coverage 131 and is about to move outside the region of wireless coverage 131, the increased rate of monitoring movement based on communications 152 ensures uninterrupted access to the Internet because the increased sampling ensures that the mobile communication device 110 is handed off to a new wireless access point prior to losing connectivity with the wireless access point 121 as further discussed below.

In accordance with further embodiments, the velocity (dBm power level/second) associated with communications is monitored to ensure that neighboring wireless access points are handoff ready and capable of a successful transition (handoff).

Figure 4:
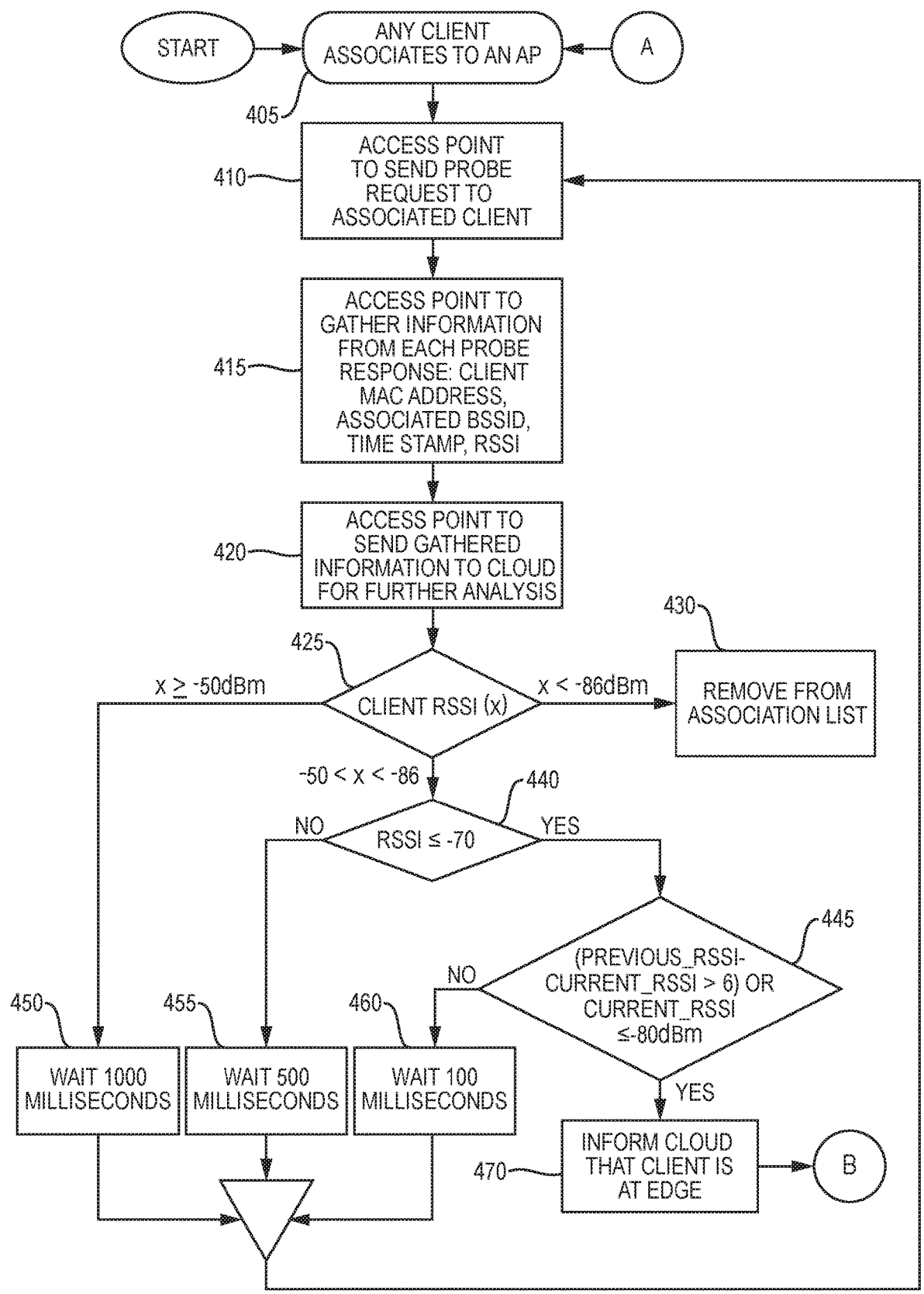
FIG. 4 is an example diagram illustrating varying a rate of communicating probe request communications to a mobile communication device depending on received power information according to embodiments herein.

FIG. 4 is an example diagram illustrating varying a rate of communicating probe request communications to a mobile communication device depending on received power information according to embodiments herein.

In processing operation 405, the mobile communication device 110 associates (establishes a respective wireless communication link 127) with the wireless access point 121 (current wireless access point or CAP).

In processing operation 410, via communications 151, the wireless access point 121 communicates a respective probe request to the communication device 110. As previously discussed, the probe request causes the communication device 110 to communicate a respective probe response (communications 152) to the wireless access point 121.

In processing operation 415, based on the communications 152, the wireless access point 121 and/or communication management resource 140 stores information associated with the received probe response. For example, in one embodiment, the wireless access point utilizes the probe response to retrieve a unique identifier value (network address) indicating that the mobile communication device 110 transmitted the communications 152. As previously discussed, the probe response from the mobile communication device 110 can further include timestamp information indicating when the response is communicated from the mobile communication device 110. Yet further, the wireless access point 121 measures a power level at which the communications 152 are received. Alternatively, the communication from the mobile communication device 110 can include power information indicating a power level at which the mobile communication device receives the communications 151.

In processing operation 420, the wireless access point 121 communicates the information associated with the probe response to a communication management resource 140 (such as in the cloud or located at any suitable location).

In processing operation 425, the wireless access point 121 analyzes the power level of the communication 152 received from the mobile communication device 110.

In response to detecting that the power level associated with communications 152 is greater than a first threshold value (−50 dBm), the wireless access point 121 initiates processing at operation 450, which includes implementing a delay of 1000 milliseconds before looping back to operation 410 and transmitting a next probe request message.

In response to detecting that the power level is less than a second threshold value (−86 dBm), the wireless access point 121 initiates processing at operation 430, which includes removing the respective mobile communication device 110 as being associated with the wireless access point 121.

In response to detecting that the power level of received communications 152 falls within the range of −50 dBm and −86 dBm, the wireless access point 121 initiates processing at operation 440. If the power level is detected as being greater than −70 dBm in processing operation 440, the wireless access point 121 initiates operation 455, which includes implementing a delay of 500 milliseconds before looping back to operation 410 and transmitting a next probe request message.

If the power level is detected as being less than −70 dBm in processing operation 440, the wireless access point 121 initiates operation 445, which checks whether the power level of the previously received communication 152 (from the mobile communication device 110) minus a power level of the currently received communication 152 is greater than 6 dBm OR the power level of the current received communication 152 is less than −80 dBm. If not (via the "no" path), the wireless access point 121 initiates execution of operation 460, which includes implementing a delay of 100 milliseconds before looping back to operation 410 and transmitting a next probe request message. Alternatively, if so (via the "yes" path), the wireless access point 121 initiates execution of operation 470, which includes notifying a communication management resource (such as a handoff controller) that the mobile communication device 110 resides at an edge of the region of wireless coverage 131. In such an instance, processing continues at operation 510 in FIG. 5.

Figure 5:
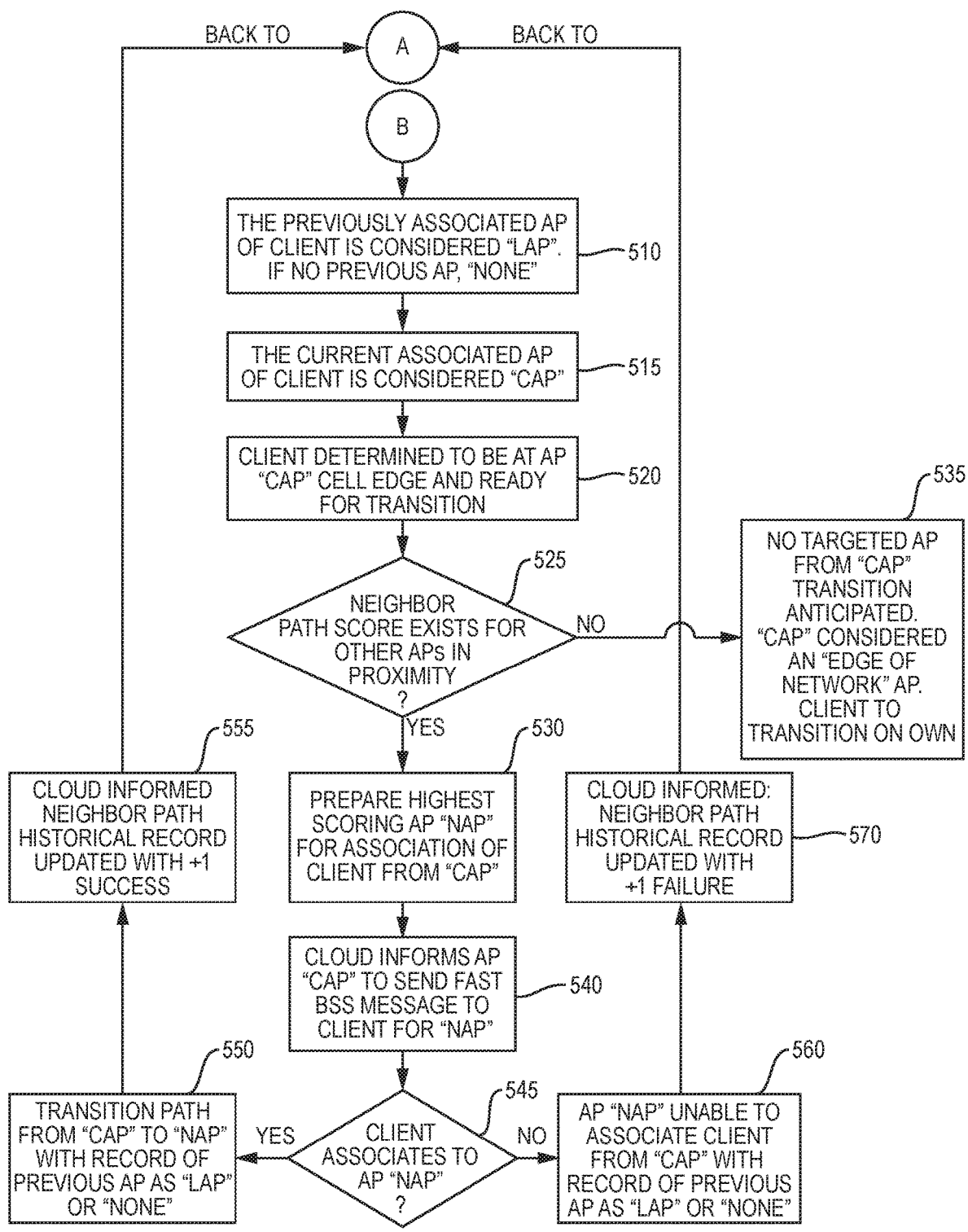
FIG. 5 is an example diagram illustrating initiation of a respective handoff from a first wireless access point to a second wireless access point based on probability metrics according to embodiments herein.

FIG. 5 is an example diagram illustrating initiation of a respective handoff from a first wireless access point to a second wireless access point based on handoff metrics according to embodiments herein.

In processing operation 510, the communication management resource 140 identifies a last access point (LAP) to which the mobile communication device 110 establishes a respective wireless communication link. If no prior associated wireless access point can be determined, then the communication management resource sets the value of LAP to none.

In processing operation 515, the communication management resource 140 sets a value of the current wireless access point (a.k.a., CAP) to the wireless access point 121 because it currently provides the wireless communication link 127 to the mobile communication device 110.

In processing operation 520, the communication management resource 140 determines, based on prior processing operation 470, that the mobile communication device 110 resides at a respective edge of the region of wireless coverage 131 associated with the current wireless access point (CAP, or wireless access point 121). In such an instance, the mobile communication device 110 is ready for a handoff to another wireless access point in the wireless network environment 100.

In processing operation 525, the communication management resource 140 determines whether a neighbor path score (NPS or handoff metric) exists for a combination of the first wireless access point 121 and other wireless access points that are potentially candidates in which to handoff the mobile communication device 110 and the wireless communication link 127 from the current wireless access point 121.

As further discussed below in FIGS. 6 and 7, the NPS metrics provide an indication of which of multiple possible wireless access points in the wireless network environment 100 is best suited to receive a handoff of the mobile communication device 110 and corresponding wireless communication link 127.

If no candidate wireless access points can be identified in processing operation 525, processing follows the "no" path; at processing operation 535, the mobile communication device 110 is left on its own in order to perform a respective handoff to another wireless access point in the wireless network environment 100. In such an instance, embodiments herein can include communicating a message from the communication management resource 140 to the mobile communication device 110 indicating that the mobile communication device 110 is required to initiate its own handoff with another wireless access point.

If a respective neighbor path score (NPS) exists for each of multiple wireless access points in proximity to the mobile communication device 110, processing follows the "yes" path from processing operation 525 to the processing operation 530. In processing operation 530, the communication management resource 140 identifies a high-scoring candidate wireless access point (for example, access point having a highest NPS) in which to perform a respective handoff. The selected candidate access point to receive the handoff is identified as the next access point (NAP).

In processing operation 540, the communication management resource (such as in the cloud or other location) informs the current wireless access point 121 to send a fast BSS message to the mobile communication device to initiate a respective handoff. Such a message to the mobile communication device indicates that the mobile communication devices to handoff to the selected wireless access point (NAP).

In processing operation 540, the mobile communication device 110 attempts to handoff the wireless communication link 127 to the chosen next wireless access point as specified by the communication management resource.

If the communication management resource determines in subsequent operation 545 that the mobile communication device 110 is able to complete the handoff to the next wireless access point specified (selected) by the communication management resource 140, then processing continues at operation 550, in which the communication management resource 140 updates its records (handoff information) indicating the transition path from the current access point to the next access point. The communication manager resource 140 updates the records to indicate that the last access point (LAP) is now wireless access point 121.

In processing operation 555, in response to detecting a successful handoff, the communication management resource updates the NPS value associated with the handoff from the wireless access point 121 to the next wireless access point. Subsequent to operation 555, processing flow continues at operation 410 in FIG. 4.

If the communication management resource 140 determines in operation 545 that the mobile communication device 110 is unable to complete the handoff to the selected next wireless access point specified by the communication management resource 140, then processing continues at operation 560, in which the communication management resource 140 updates its records (a.k.a., handoff information) indicating the failed transition from the current access point to the selected next access point. The communication manager resource 140 updates the records to indicate that there was no handoff.

In processing operation 570, in response to detecting a failed handoff, the communication management resource 140 updates the NPS value associated with the handoff from the wireless access point 121 to the next wireless access point. Subsequent to operation 570, processing flow continues at operation 410 in FIG. 4.

In this manner, via flow in FIGS. 4 and 5, embodiments herein include controlling a rate of probe communications as well as initiating a handoff based on metrics such as NPS values.

FIG. 6 is an example diagram illustrating metrics used as a basis to initiate handoffs of mobile communication devices according to embodiments herein.

In this example embodiment, handoff information 610 includes metrics generated and maintained by the communication management resource 140. For example, handoff information 610 includes an NPS metric for each of the different possible handoff metrics associated with each of the wireless access points.

In one embodiment, each NPS metric in the handoff information 610 indicates a history of prior handoffs of other mobile communication devices from the wireless access point 121 to a next wireless access point. Higher NPS values indicate a higher likelihood that a handoff from a respective mobile communication device to a respective candidate wireless access point will be more successful.

The communication management resource 140 updates the NPS values in a respective table for a wireless access point each time a mobile communication device is handed off from the corresponding wireless access point. In one embodiment, the communication management resource 140 generates the NPS value as follows:

> NPS=(# OF SUCCESFUL HANDOFF FROM "CAP" TO "NAP"-# OF FAILED HANDOFFS OF "CAP" TO "NAP"+# OF NON-CLOUD CLIENT TRANSITIONS+# TOTAL "CAP" TO "NAP" FAST TRANSITIONS)/# TOTAL CLIENT TRANSITIONS, where:
TRANSITION=handoff,
CAP=current access point,
NAP=next access point,
NON-CLOUD CLIENT TRANSITION=mobile communication device handoff unassisted by the communication management resource 140 (i.e., the mobile communication device 110 determines which access point to initiate a handoff independent of the communication management resource 140 and handoff information 610).

Thus, over time, the NPS value for a respective wireless access point is updated depending on prior successful/unsuccessful handoffs from the given wireless access point.

Figure 7:
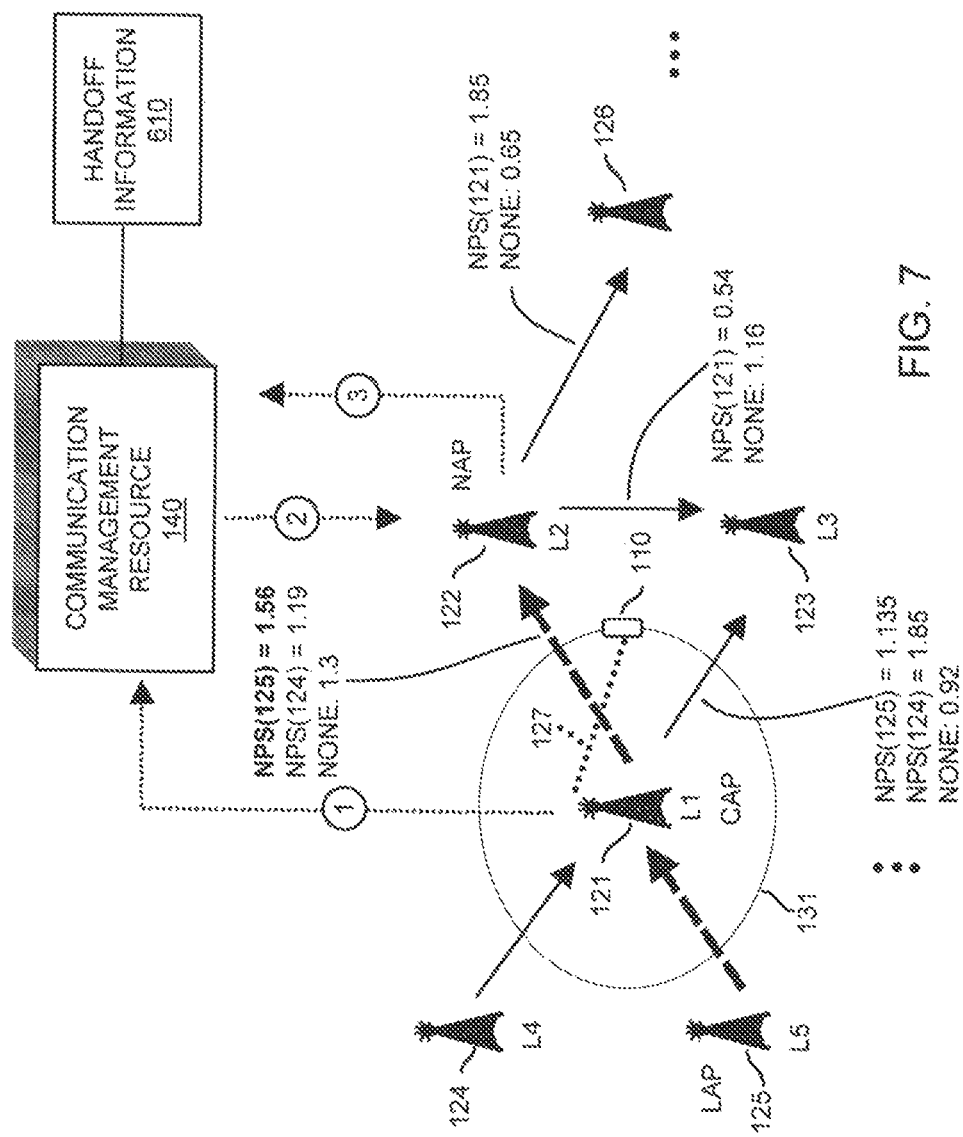
FIG. 7 is an example diagram illustrating a communication management resource facilitating handoff of a mobile communication device according to embodiments herein.

FIG. 7 is an example diagram illustrating a communication management resource facilitating handoff of a mobile communication device according to embodiments herein.

As previously discussed, certain embodiments herein include a handoff management system operable to manage their authentication and roaming behavior. This management system creates a record of the wireless access point's client (mobile communication device) association information and probe rate of change by probe request/response signal levels that permits the communication management resource cloud to generate graphs of the best next serving WAPs, with regard of proximity and user ground speed. Via graph generation, the management system is operable to predict the likelihood of authenticated clients transitioning to a specific nearby WAP (Wireless Access Point) and enhance the roaming capability of the overall (public) Wi-Fi™ system without diminishing its throughput capacity.

In accordance with further embodiments, the handoff of the mobile communication device 110 and corresponding wireless communication link 127 can be based on a prediction or probability of which of the multiple candidate wireless access points in wireless network environment 100 is most likely suited (such as highest probability) to successfully receive the handoff of the mobile communication device.

In one embodiment, selection of the best suited wireless access point for the handoff is based on which of the available wireless access points historically provides a higher rate (higher probability) of successfully receiving handoffs of other mobile communication devices from the first wireless access point 121.

In accordance with further embodiments, the communication management resource 140 initiates a handoff of the mobile communication device 110 from the first wireless access point 121 to a second wireless access point (such as one of candidate wireless access points 122, 123) in wireless network environment 100 based on the quantified motion and/or predicted location (such as based on analysis of probe responses) of the mobile communication device 121.

As further discussed herein, the communication management resource 140 selects amongst multiple wireless access points in which to handoff the mobile communication device 121 based on respective NPS values assigned to the different handoff possibilities. As previously discussed, the NPS handoff metrics represent a prior success rate of performing handoffs under the same or similar handoff conditions.

In this example embodiment, via processing operation #1, the communication management resource 140 receives notification that the mobile communication device 110 resides at (moves to) an edge further of the region of wireless coverage 131 and that a handoff is appropriate based on detecting that the mobile communication device 110 is moving in a direction toward either wireless access point 122 or wireless access point 123. Thus, both of these wireless access points 122 and 123 are candidates for the handoff.

Additionally, in processing operation #1, the communication management resource 140 tracks a handoff path associated with mobile communication device 110. For example, assume that the mobile communication device 110 handed off from wireless access point 125 (LAP) to wireless access point 121 (CAP) prior to being handed off again to a next access point (NAP) such as one of wireless access points 122 and 123.

In processing operation #2, the communication management resource 140 uses handoff information 610 and corresponding NPS metrics as a basis to select which of the multiple wireless access points to initiate the handoff. For example, given the handoff options associated with wireless access point 122 and 123, and that the NPS metric [NPS (125)=1.56] associated with the first sequence or combination of wireless access points 125-122-121 is greater than NPS metric [NPS(125)=1.135] associated with second sequence or combination of wireless access points 125-121-123, the communication management resource selects wireless access point 122 [NPS(125)=1.56] to initiate the handoff of mobile communication device 110 and corresponding wireless communication link 127 because wireless access point 122 (sequence of wireless access points 125-121-122) has a higher chance than wireless access point 123 (sequence of wireless access points 125-121-123) of providing a successful handoff from the wireless access point 121 (CAP) given that the last wireless access point (LAP) was wireless access point 125.

In processing operation #3, subsequent to the handoff of the wireless communication link 127 and mobile communication device 110 from the wireless access point 121, the communication management resource 140 receives feedback indicating whether the handoff was a success or a failure. The communication management resource 140 updates the NPS value for the route 125-121-122 in handoff information 610 according to the equation as previously discussed.

Thus, the communication management resource 140: identifies multiple candidate wireless access points 122 and 123 in which to handoff the mobile communication device 110, the multiple candidate wireless access points including a first candidate wireless access point 122 and a second candidate wireless access point 123; retrieves a first metric NPS(125)=1.56 associated with sequence 125-121-122, the first metric indicating a prior success rate (or probability) of handing off communication devices from the first wireless access point 121 to the first candidate wireless access point 122 when wireless access point 125 is the last wireless access point (LAP); retrieves a second metric NPS (125)=1.135 associated with sequence 125-121-123, the second metric indicating a prior success rate (or probability) of handing off communication devices from the first wireless access point 121 to the second candidate wireless access point 123; and utilizes the first metric and the second metric as a basis to select amongst the multiple candidate wireless access points in which to handoff the mobile communication device. As previously discussed, in processing operation #3, the communication management resource (or other suitable resource) adjusts the first metric based on a respective success of handing off the mobile communication device 110 to the first candidate wireless access point 122.

Thus, embodiments herein include selecting amongst multiple candidate wireless access points in which to handoff the mobile communication device 110 based at least in part on a wireless access point from which the mobile communication device was handed off to the first wireless access point 121. For example, in this case, the mobile communication device 121 was handed off from the wireless access point 125 (a.k.a., LAP). The NPS metrics in handoff information 610 indicate that the best handoff option is wireless access point wireless access point 122 because it provides the highest NPS value (NPS=1.56 is greater than NPS=1.135).

Figure 8:
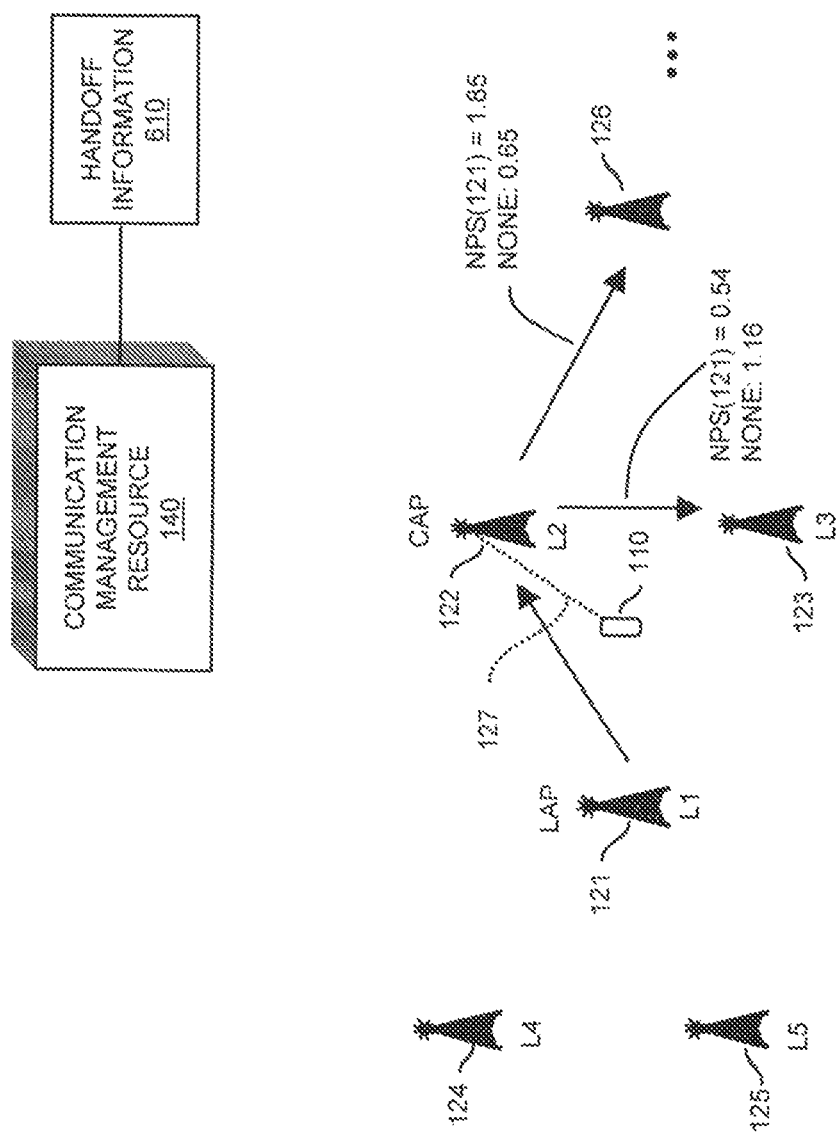
FIG. 8 is an example diagram illustrating completion of a handoff according to embodiments herein.

FIG. 8 is an example diagram illustrating completion of a handoff according to embodiments herein.

Upon completion of the handoff, mobile communication device 110 is in wireless communication with wireless access point 122 via the wireless communication link 127. Wireless access point 121 becomes the last wireless access point; wireless access point 122 becomes the current wireless access point.

If a further handoff is required because the mobile communication device 110 moves away from wireless access point 122 and nears an edge of its corresponding region of wireless coverage, in a manner as previously discussed, the communication management resource 140 selects wireless access point 126 as a next handoff option because NPS (121)=1.85 associated with wireless access point wireless access point 126 (and sequence 121-122-126) is greater than NPS(121)=0.54 associated with wireless access point wireless access point 123 (and sequence 121-122-123).

Figure 9:
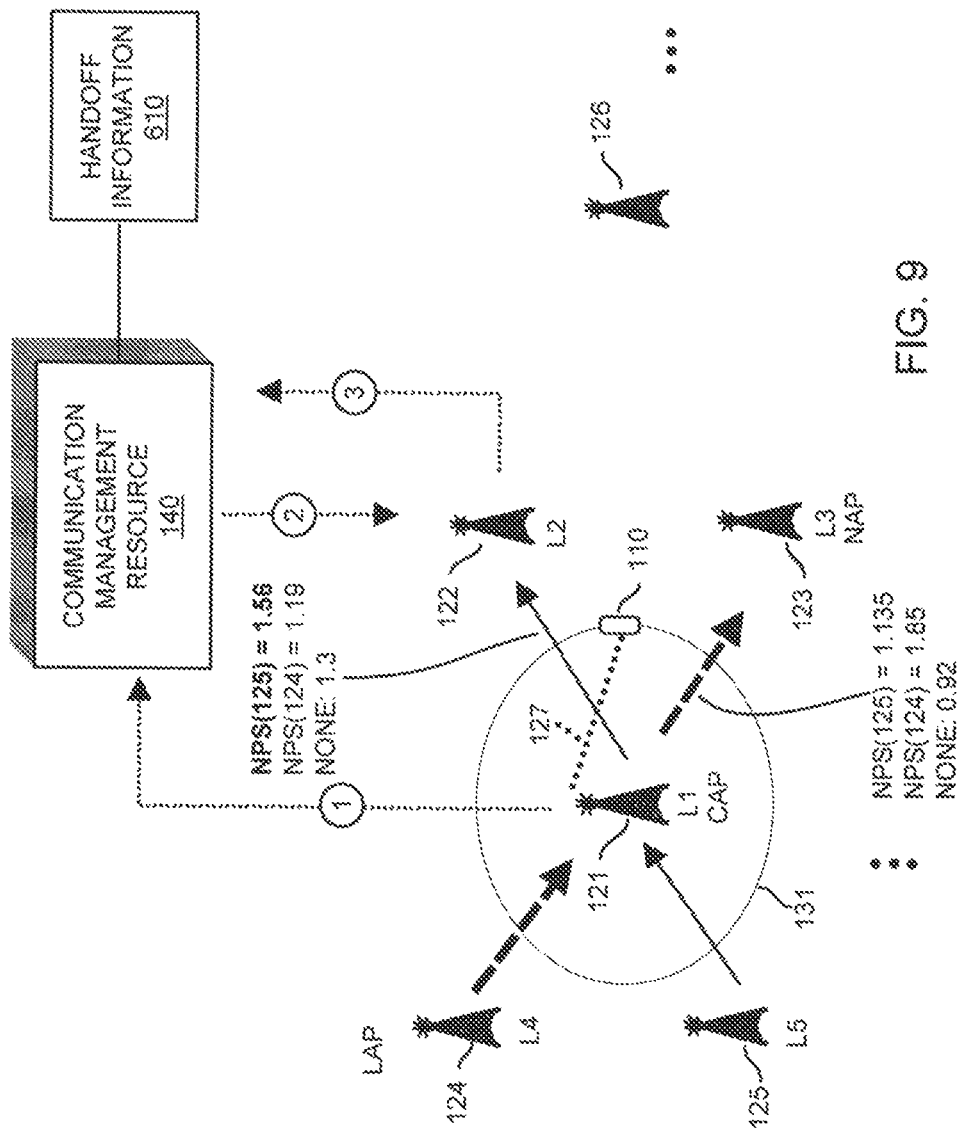
FIG. 9 is an example diagram illustrating a communication management resource facilitating handoff of a mobile communication device according to embodiments herein.

FIG. 9 is an example diagram illustrating a communication management resource facilitating handoff of a mobile communication device according to embodiments herein.

Assume in this example embodiment that the last wireless access point (LAP) is wireless access point 124 and that the current wireless access point is wireless access point 121. Further assume that the mobile communication device 110 moves to a location in wireless network environment 100 in which the communication management resource 140 decides that the mobile communication device 110 needs to be handed off to wireless access point 122 or wireless access point 123.

In this instance, the communication management resource 140: identifies multiple candidate wireless access points 122 and 123 in which to handoff the mobile communication device 110, the multiple candidate wireless access points including a first candidate wireless access point 122 and a second candidate wireless access point 123; retrieves a first metric NPS(124)=1.19 (associated with wireless access point sequence or route path 124-121-122), the first metric indicating a prior success rate of handing off communication devices from the first wireless access point 121 to the candidate wireless access point 122 when wireless access point 124 is the last wireless access point (LAP); retrieves a second metric NPS(124)=1.85 (associated with wireless access point sequence or route path 124-121-123), the second metric indicating a prior success rate of handing off communication devices from the first wireless access point 121 to the second candidate wireless access point 123; and utilizes the first metric and the second metric as a basis to select amongst the multiple candidate wireless access points in which to handoff the mobile communication device.

In this example, the communication management resource 140 selects the greater of first metric and second metric, resulting in selection of the wireless access point 123 for the handoff of mobile communication device 110 and corresponding wireless communication link 127.

In a similar manner as previously discussed, in processing operation #3, the communication management resource (or other suitable resource) adjusts the second metric based on a respective success or failure of handing off the mobile communication device 110 to the second candidate wireless access point 123.

Thus, embodiments herein include selecting amongst multiple candidate wireless access points in which to handoff the mobile communication device 110 based at least in part on a wireless access point (124) from which the mobile communication device was handed off to the first wireless access point 121. For example, in this case, the mobile communication device 121 was handed off from the wireless access point 124 (a.k.a., LAP). The NPS metrics in handoff information 610 indicate that the best handoff option is wireless access point wireless access point 123 because it provides the highest NPS value (NPS=1.85 is greater than NPS=1.19).

Figure 10:
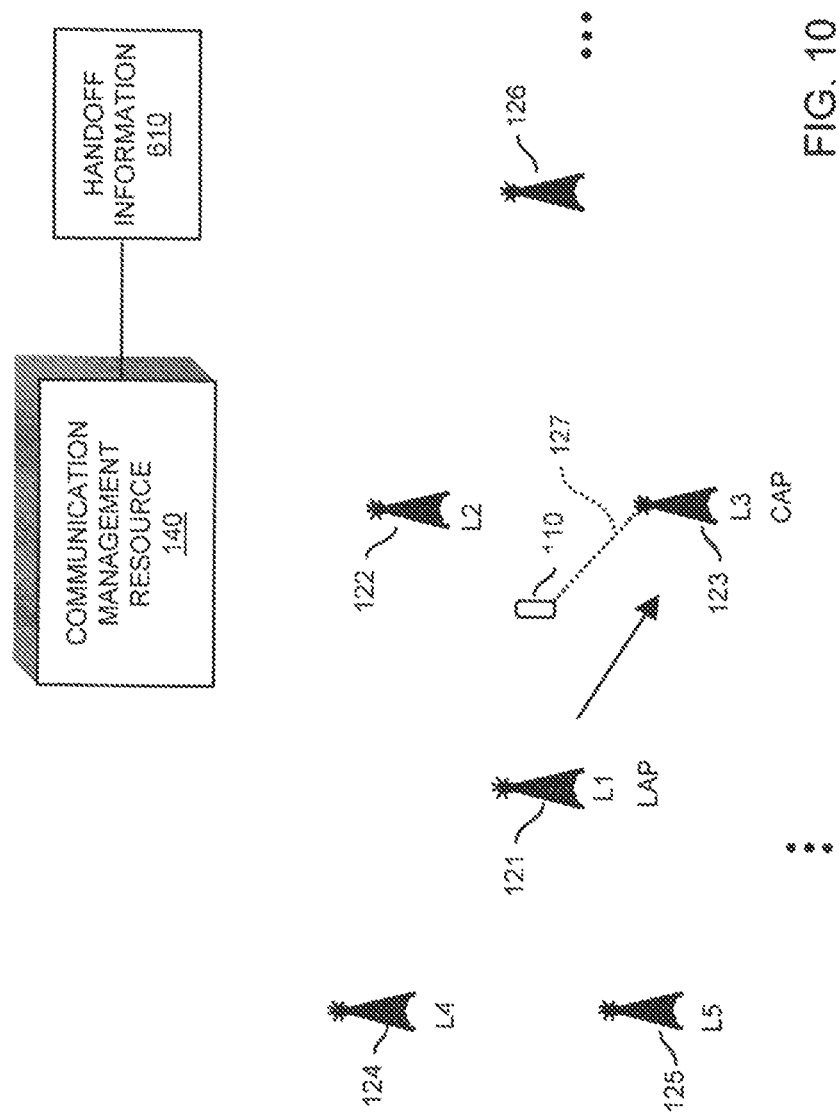
FIG. 10 is an example diagram illustrating completion of a handoff according to embodiments herein.

FIG. 10 is an example diagram illustrating completion of a handoff according to embodiments herein.

Upon completion of the handoff, mobile communication device 110 is in wireless communication with wireless access point 123 via the wireless communication link 127.

Figure 11:
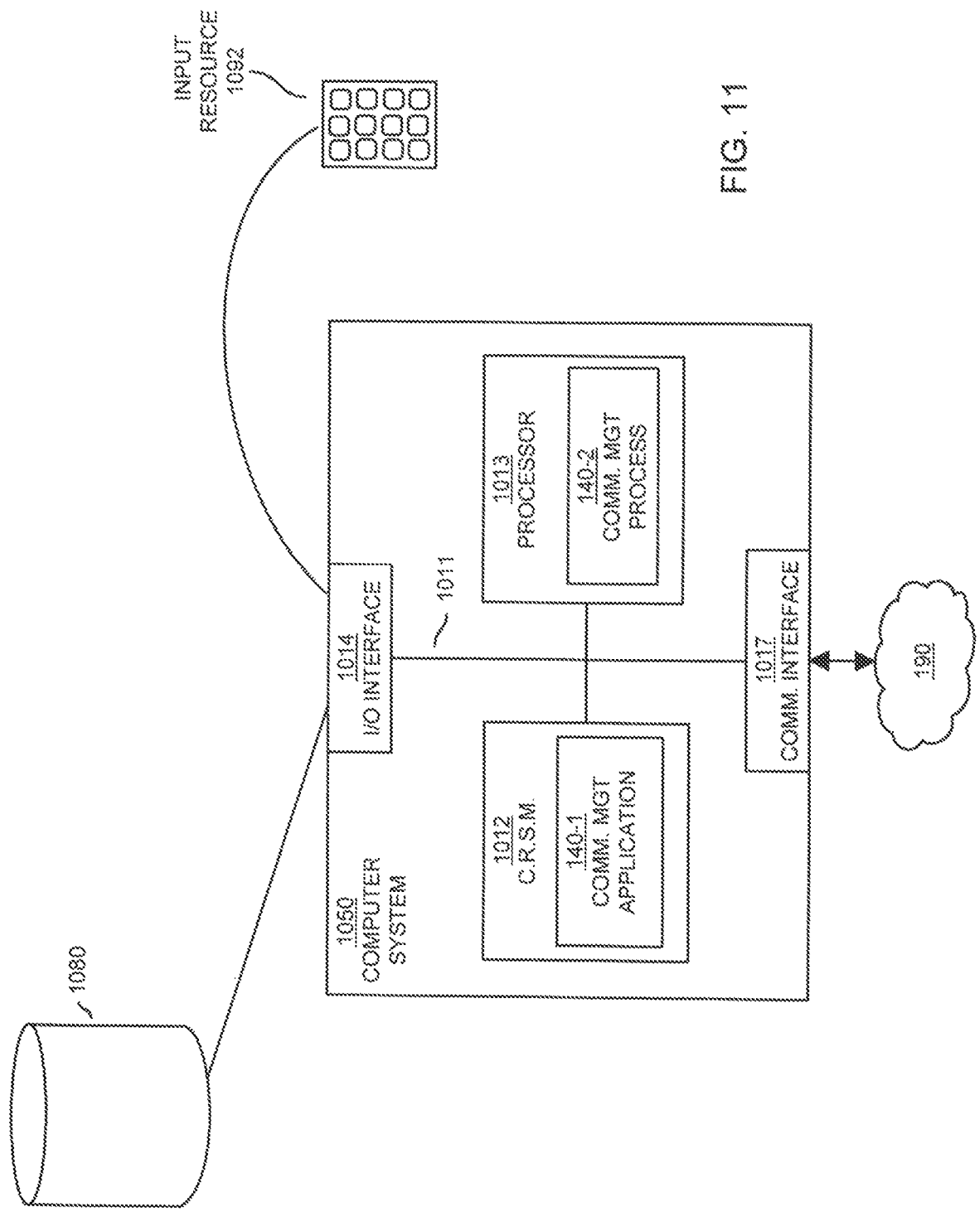
FIG. 11 is an example diagram illustrating example computer architecture operable to execute one or more operations according to embodiments herein.

FIG. 11 is an example block diagram of a computer system for implementing any of the operations as previously discussed according to embodiments herein.

Any of the resources (such as communication management resource 140, etc.) as discussed herein can be configured to include computer processor hardware and/or corresponding executable instructions to carry out the different operations as discussed herein.

As shown, computer system 1150 of the present example includes an interconnect 1111 that couples computer readable storage media 1112 such as a non-transitory type of media (i.e., any type of hardware storage medium) in which digital information can be stored and retrieved, a processor 1113, I/O interface 1114, and a communications interface 1117.

I/O interface(s) 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with management application 140-1 (e.g., including instructions) to carry out any of the operations as discussed herein.

During operation of one embodiment, processor 1113 accesses computer readable storage media 1112 via the use of interconnect 1111 in order to launch, run, execute, interpret or otherwise perform the instructions in management application 140-1 stored on computer readable storage medium 1112. Execution of the management application 140-1 produces management process 140-2 to carry out any of the operations and/or processes as discussed herein.

Those skilled in the art will understand that the computer system 1150 can include other processes and/or software and hardware components, such as an operating system that controls allocation and use of hardware resources to management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Functionality supported by the different resources will now be discussed via flowcharts in FIGS. 12-13. Note that the steps in the flowcharts below can be executed in any suitable order.

Figure 12:
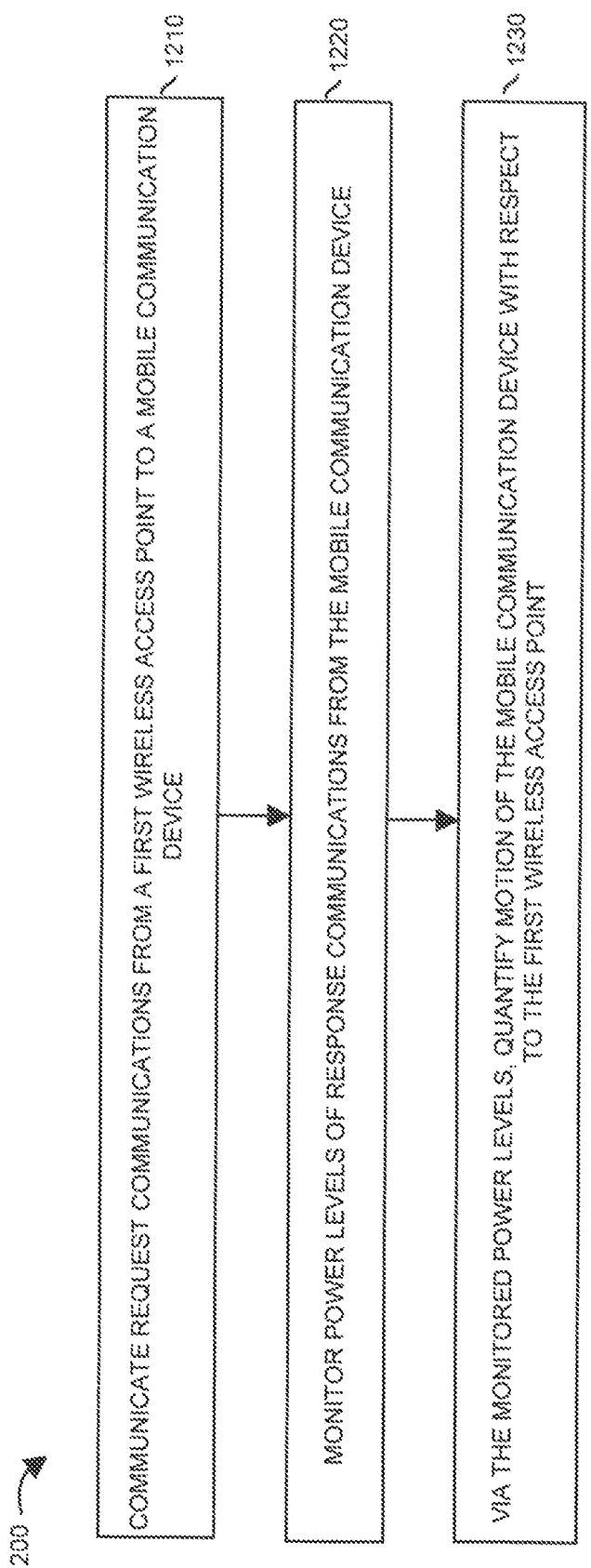
FIGS. 12-13 are example diagrams illustrating methods according to embodiments herein.

FIG. 12 is a flowchart 1200 illustrating an example method according to embodiments. Note that there will be some overlap with respect to concepts as discussed above.

In processing operation 1210, a communication management resource 140 associated with wireless access point 121 communicates request communications 151 from the first wireless access point 121 to a mobile communication device 110.

In processing operation 1220, the communication management resource 140 of the first wireless access point 121 monitors power levels of response communications 152 received from the mobile communication device 110.

In processing operation 1230, via the monitored power levels, the communication management resource 140 of the first wireless access point 121 quantifies motion of the mobile communication device 110 with respect to the first wireless access point 121.

Figure 13:
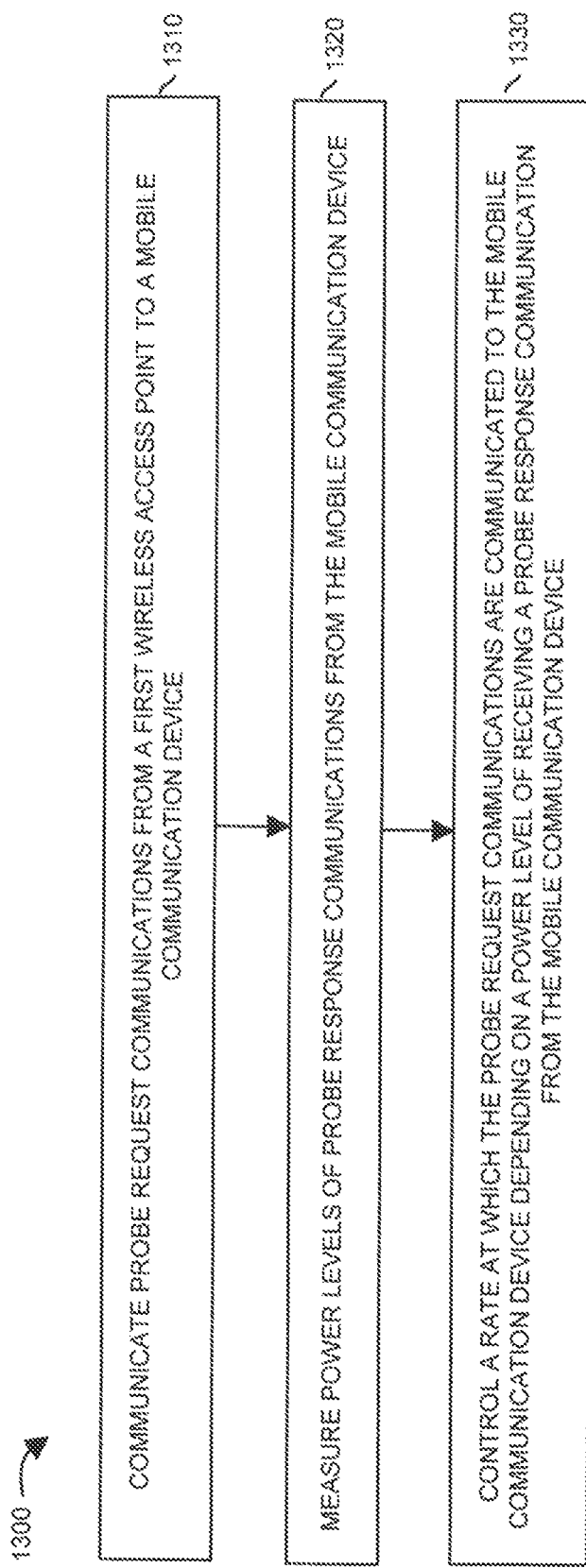

FIG. 13 is a flowchart 1300 illustrating an example method according to embodiments. Note that there will be some overlap with respect to concepts as discussed above.

In processing operation 1310, a communication management resource 140 of the first wireless access point 121 communicates request communications 151 from the first wireless access point 121 to a mobile communication device 110.

In processing operation 1320, the communication management resource 140 of the first wireless access point 121 measures power levels of response communications 152 from the mobile communication device 110.

In processing operation 1330, the communication management resource 140 of the first wireless access point 121 controls (varies) a rate at which the mobile communication device 110 communicates wireless signals to the first wireless access point 121 depending on a power level of the first wireless access point receiving the response communications 152 from the mobile communication device 110.

Note again that techniques herein are well suited to facilitate improved use of wireless resources and corresponding wireless connectivity in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   communicating wireless probe request communications from a first wireless access point to a mobile communication device;
   measuring power levels of wireless probe response communications received from the mobile communication device, the wireless probe response communications transmitted from the mobile communication device as a response to the wireless probe request communications; and
   via the measured power levels of the wireless probe response communications from the mobile communication device, quantifying motion of the mobile communication device with respect to the first wireless access point.

2. The method as in claim 1 further comprising:
   initiating a handoff of the mobile communication device from the first wireless access point to a second wireless access point in a network environment based on the quantified motion.

3. The method as in claim 1 further comprising:
producing a metric, a magnitude of which indicates a success rate associated with handoffs from the first wireless access point to a second wireless access point.

4. The method as in claim 1 further comprising:
selecting amongst multiple wireless access points in which to handoff the mobile communication device based on a prediction of which of the multiple wireless access points provides successful handoffs from the first wireless access point.

5. The method as in claim 1 further comprising:
controlling a rate at which the wireless probe request communications are communicated to the mobile communication device depending on a power level of receiving a wireless probe response communication from the mobile communication device.

6. The method as in claim 5, wherein controlling the rate includes increasing a rate of communicating the wireless probe request communications to the mobile communication device in response to detecting that the mobile communication device is near an edge of a wireless coverage region provided by the first wireless access point.

7. The method as in claim 1 further comprising:
identifying multiple candidate wireless access points in which to handoff the mobile communication device, the multiple candidate wireless access points including a first candidate wireless access point and a second candidate wireless access point;
retrieving a first metric, the first metric indicating a prior success rate of handing off communication devices from the first wireless access point to the first candidate wireless access point;
retrieving a second metric, the second metric indicating a prior success rate of handing off communication devices from the first wireless access point to the second candidate wireless access point; and
utilizing the first metric and the second metric as a basis to select amongst the multiple candidate wireless access points in which to handoff the mobile communication device.

8. The method as in claim 7 further comprising:
adjusting the first metric based on a respective success of handing off the mobile communication device to the first candidate wireless access point.

9. The method as in claim 1 further comprising:
selecting amongst multiple candidate wireless access points in which to handoff the mobile communication device based at least in part on a wireless access point from which the mobile communication device was handed off to the first wireless access point.

10. The method as in claim 1, wherein quantifying the motion of the mobile communication device with respect to the first wireless access point includes:
detecting that a distance between the mobile communication device and the first wireless access point is changing.

11. The method as in claim 10 further comprising:
depending on a detected direction and a magnitude of most recent determined power levels of the wireless probe response communications, initiating a handoff from the first wireless access point to a second wireless access point.

12. The method as in claim 1, wherein quantifying the motion of the mobile communication device with respect to the first wireless access point includes determining a rate at which a received wireless signal strength of the wireless probe response communications received from the mobile communication device vary over time.

13. The method as in claim 1 further comprising:
controlling a rate of communicating the wireless probe request communications to the mobile communication device based on a detected nearness of the mobile communication device to an edge of a wireless coverage region provided by the first wireless access point.

14. The method as in claim 13 further comprising:
determining the nearness of the mobile communication device to the edge of the wireless coverage region based on the measured power levels of the wireless probe response communications.

15. The method as in claim 1, wherein the mobile communication device communicates the wireless probe response communications to the first wireless access point at a fixed power level.

16. The method as in claim 1, wherein each of the wireless probe response communications includes a network address of the mobile communication device.

17. The method as in claim 1, wherein the received wireless probe response communications include a power level at which the mobile communication device received a wireless communication from the first wireless access point.

18. The method as in claim 1 further comprising:
increasing a rate of communicating the wireless probe request communications to the mobile communication device in response to detecting that a power level of receiving the wireless probe response communications from the mobile communication device over time.

19. The method as in claim 1 further comprising:
selecting a candidate wireless access point in which to handoff the mobile communication device from the first wireless access point based on the quantified motion of the mobile communication device.

20. The method as in claim 1 further comprising:
comparing a first received wireless probe response communication from the mobile communication device to a threshold value; and
based on results of the comparing, controlling a wireless power level of transmitting a wireless probe request communication to the mobile communication device.

21. The method as in claim 1 further comprising:
producing a metric indicating a respective success of handing off mobile communication devices from the first wireless access point to a candidate wireless access point; and
adjusting the metric based on a success of handing off the mobile communication device from the first wireless access point to the candidate wireless access point.

22. The method as in claim 1 further comprising:
quantifying the motion of the mobile communication device based on a comparison of the measured power levels of the wireless probe response communications from the mobile communication device to a threshold value.

23. The method as in claim 1, wherein measuring power levels of wireless probe response communications received from the mobile communication device includes:
determining a first power level of receiving a first wireless probe response communication from the mobile communication device; and
determining a second power level of receiving a second wireless probe response communication from the mobile communication device.

24. A system comprising:
a first wireless access point;
a second wireless access point; and
a communication management resource operable to:
  communicate wireless probe request communications from the first wireless access point to a mobile communication device;
  measure power levels of wireless probe response communications from the mobile communication device, the wireless probe response communications transmitted from the mobile communication device as a response to the wireless probe request communications; and
  via the measured power levels of the wireless probe response communications from the mobile communication device, quantify motion of the mobile communication device with respect to the first wireless access point.

25. The system as in claim 24, wherein the communication management resource is further operable to:
  initiate a handoff of the mobile communication device from the first wireless access point to the second wireless access point in a network environment based on the quantified motion.

26. The system as in claim 24, wherein the communication management resource is further operable to:
  produce a metric, a magnitude of which indicates a success rate associated with handoffs from the first wireless access point to a second wireless access point.

27. The system as in claim 24, wherein the communication management resource is further operable to:
  select amongst multiple wireless access points in which to handoff the mobile communication device based on a prediction of which of the multiple wireless access points historically provides successful handoffs from the first wireless access point.

28. The system as in claim 24, wherein the communication management resource is further operable to:
  control a rate at which the wireless probe request communications are communicated to the mobile communication device depending on a power level of receiving a wireless probe response communication from the mobile communication device.

29. The system as in claim 28, wherein the communication management resource is further operable to:
  increase a rate of communicating the wireless probe request communications to the mobile communication device in response to detecting that the mobile communication device is near an edge of a wireless coverage region provided by the first wireless access point.

30. The system as in claim 24, wherein the communication management resource is further operable to:
  identify multiple candidate wireless access points in which to handoff the mobile communication device, the multiple candidate wireless access points including a first candidate wireless access point and a second candidate wireless access point;
  retrieve a first metric, the first metric indicating a prior success rate of handing off communication devices from the first wireless access point to the first candidate wireless access point;
  retrieve a second metric, the second metric indicating a prior success rate of handing off communication devices from the first wireless access point to the second candidate wireless access point; and
  utilize the first metric and the second metric as a basis to select amongst the multiple candidate wireless access points in which to handoff the mobile communication device.

31. The system as in claim 30, wherein the communication management resource is further operable to:
  adjust the first metric based on a respective success of handing off the mobile communication device to the first candidate wireless access point.

32. The system as in claim 24, wherein the communication management resource is further operable to:
  select amongst multiple candidate wireless access points in which to handoff the mobile communication device based at least in part on a wireless access point from which the mobile communication device was handed off to the first wireless access point.

33. The system as in claim 24, wherein the communication management resource is further operable to:
  detect that the mobile communication device is moving closer to the first wireless access point.

34. The system as in claim 33, wherein the communication management resource is further operable to:
  depending on a detected direction and a magnitude of most recent determined power levels of the wireless probe response communications, initiate a handoff from the first wireless access point to a second wireless access point.

35. The system as in claim 24, wherein the communication management resource is further operable to:
  determine a rate at which a received wireless signal strength of the wireless probe response communications received from the mobile communication device vary over time.

36. A method comprising:
communicating wireless probe request communications from a first wireless access point to a mobile communication device;
receiving wireless probe response communications from the mobile communication device;
controlling a rate at which the wireless probe request communications are communicated to the mobile communication device based on the wireless probe response communications received from the mobile communication device; and
wherein controlling the rate at which the wireless probe request communications are communicated includes: increasing a rate of communicating the wireless probe request communications to the mobile communication device in response to detecting that the mobile communication device is moving toward an edge of a wireless coverage region provided by the first wireless access point.

37. The method as in claim 36 further comprising:
controlling the rate at which the wireless probe request communications are communicated to the mobile communication device based on wireless power levels of receiving the wireless probe response communications from the mobile communication device.

38. A method comprising:
communicating wireless probe request communications from a first wireless access point to a mobile communication device;
receiving wireless probe response communications from the mobile communication device; and
controlling a rate at which the wireless probe request communications are communicated to the mobile communication device based on the wireless probe response communications received from the mobile communication device; and wherein controlling the rate at which the wireless probe request communications are communicated includes:

decreasing a rate of communicating the wireless probe request communications to the mobile communication device in response to detecting that the mobile communication device is moving nearer to the first wireless access point.

* * * * *